Jan. 10, 1939.                G. T. WRIDE                2,143,426
                           WRITING COORDINATOR
                          Filed Aug. 5, 1936
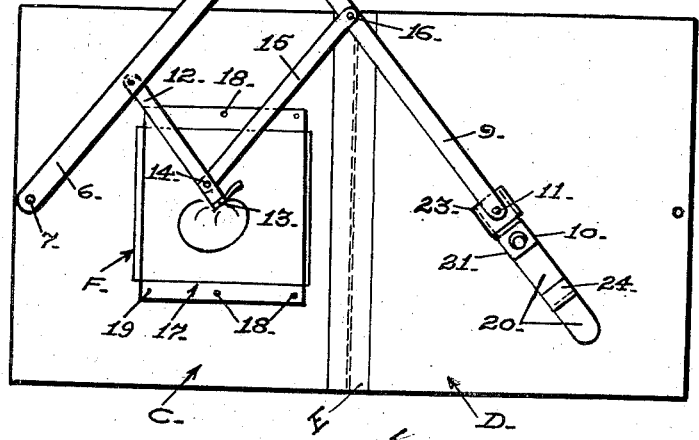
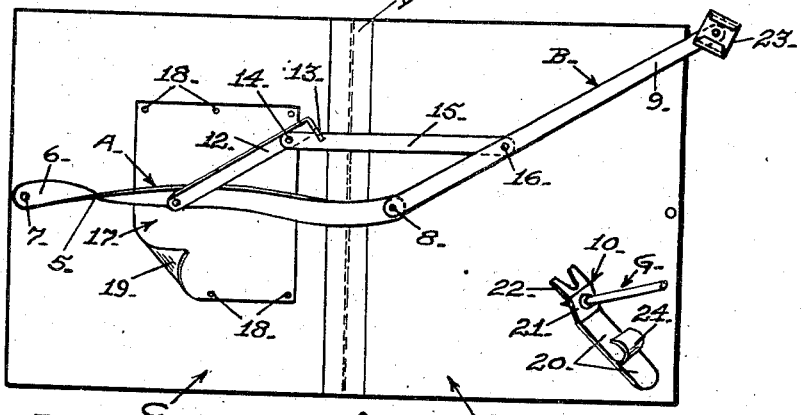
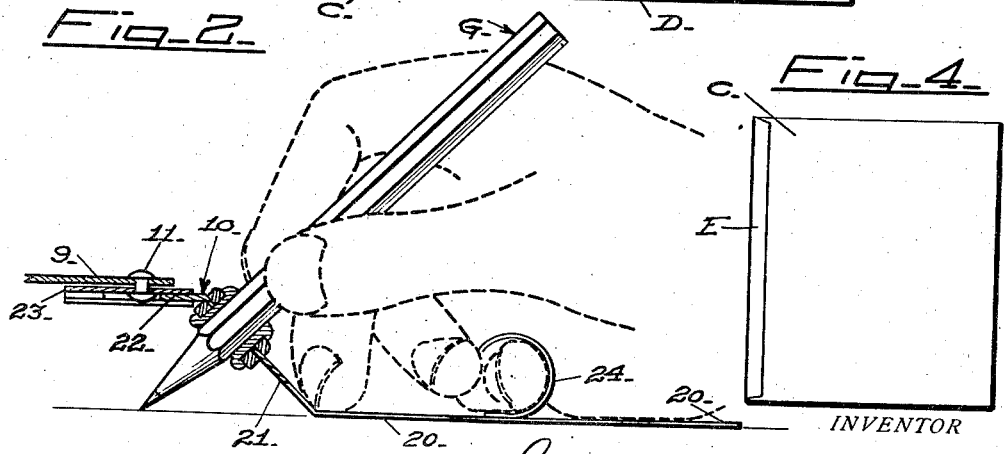
Fig. 1.
Fig. 2.
Fig. 3.
Fig. 4.
INVENTOR
George T. Wride Patented Jan. 10, 1939

2,143,426

UNITED STATES PATENT OFFICE 2,143,426

WRITING COORDINATOR

George T. Wride, Los Angeles, Calif.

Application August 5, 1936, Serial No. 94,396

6 Claims. (Cl. 35—36)

This invention relates in general to improvements in educational appliances and more particularly pertains to a device which may be efficaciously and advantageously used in teaching the arts of writing and drawing.

An object of this invention is to provide an appliance such as hereinafter described which will develop a proper coordination of the eye and hand for writing and drawing purposes by requiring in its use that the user keeps the eyes on the model or image that is being reproduced while manipulating the pencil with the hand.

A further object is to provide an appliance such as described which in effect consists of a pantograph in a "book" in that the pantograph is attached to a base comprised of rigid sections like a book binder, and which when closed or folded substantially encompasses the pantograph and provides a small, compact, book-like device not readily subject to breakage or derangement.

Another object is to provide an appliance such as described which in effect consists of a pantograph with the pencil-holding portion adapted to hold the pencil on the writing slant so that it can be manipulated as in ordinary writing or drawing.

Another object is to provide a device such as described, wherein a flexible member or link, a part of the pantograph, permits of free movement of the pantograph-unit bodily, relative to the base, without having a hinged joint and without damage to the unit or its anchorage to the base.

Yet another object is to provide an appliance such as described wherein a base is provided with a novel image or model-holding means which permits ready and accurate tracing of the image without damage thereto or slipping thereof.

Still another object is to provide an appliance such as described wherein a pencil holder can be readily detached from the pantograph so that the movement and technique set up by the device can be carried on without it.

A further object is to provide a device such as described which requires the user to hold the pencil in the writing position and which will eliminate a fulcrum or rest on the desk for any part of the hand.

With the above and other objects in view the invention subsists in the novel construction and combination of parts hereinafter described, illustrated in the accompanying drawing, and set forth in the claims hereto appended. It being understood that various changes in form, proportion, size and minor details of construction within the scope of the claims may be resorted to without departing from the spirit or sacrificing any of the advantages of the invention.

Fig. 1 is a top plan view of the device of this invention.

Fig. 2 is a top plan view of the device showing the pantograph portion completely turned over by bending the flexible link as at 5 without requiring a hinge or joint. Fig. 2 also shows the pencil-holding unit detached from the pantograph.

Fig. 3 is an enlarged view of the pencil-holding unit showing the use of the hook for the little finger and the extended apron which keeps the "heel" of the hand from touching the desk.

Fig. 4 is a reduced plan view of the "book" or base with the pantograph removed and the parts C and D folded upon each other by means of the cloth hinge E.

One embodiment of the invention as shown in the accompanying drawing may in general be described as a pantograph with the pencil-holding attachment adjusted to hold the pencil in the preferred angle for writing.

As here shown the pantograph comprises an attaching link 6 pivotally anchored at one end, as at 7, to the base section C and pivoted at the other end as at 8, to one end of the "pencil link" 9. At the other end of the link 9 a pencil holder is pivotally attached, as at 11. Pivoted at one end to the link 6, at a point between the ends of the latter, is a tracing bar 12 having a downwardly turned tracing point 13 on its free end. Pivoted at one end, as at 14, to a point near the free end of the tracing bar 12 is a tracing bar link 15 at the other end of which it is pivoted, as at 16, to the link 9.

It is now apparent that the tracing bar 12 and its free point 13 will operate over the base section C, whereas the pencil holder 10 and the pencil it holds will operate over the base section D.

In this connection it will be noted that the base section C is provided with a flexible transparent flap or cover sheet 17 rigidly joined by the fastenings 18 to the said base section and under which may be placed the picture or model to be copied. The model is shown at F in Fig. 1. A free corner 19 of the cover 17 is shown and provided to insert and remove the copy or model that is to be traced. The flap 17 not only holds the copy but protects it from being marked or mutilated by the tracing point 13.

The pencil holder 10 comprises a plate-like member; the major portion of which is in the form of a flat apron body 20 which is adapted to support the fingers and part of the hand and to slide freely on the writing paper that may be attached to the base section D. Between its ends the pencil holder 10 is provided with an angularly disposed pencil holding portion 21 in the aperture of which is a rubber grommet or clamp of any nature in which latter the pencil G may be frictionally retained. Extending longitudinally from the angular portion 21 of the pencil holder 10 is a short ear portion 22 which is made to fit into a slide 23, pivoted as at 11, to the pencil link 9. This ear portion 22 is disposed at the proper angle so that it holds the pantograph up, to clear the paper, when the heel of the hand presses the apron down flat, in the nature of a rocker or lever. The slant of the angular portion 21 determines the angle of the pencil. It can be seen that if the fingers and heel of the hand rest on the apron any movement of the fingers alone will be difficult, if not impossible, and the desired arm movement will be induced, as the fingers and hand must be moved together to manipulate the pencil.

To keep the hand from lifting to free itself from contact with the apron portion, a hooked grip that is adjustable by bending, is provided as at 24, into which the little finger fits. The grip 24 further determines the point of rest and serves to attach the whole to the hand.

To prevent breaking or deranging the pantograph, the attaching link 6 is made of highly flexible, flat material which will be substantially rigid relative to the plane of the base C but flexible to normal angles thereto. With such a link the entire pantograph may be lifted or swung upwardly from the base without damage to the appliance or to the pivot 7. Celluloid, rubber or spring steel are well suited for link 6. In Fig. 2 an illustration is given of the pantograph portion turned over.

It should be noted that the pencil holder unit 10 will turn as required on its pivotal connections 11 with the pencil link 9 and that the pencil disposition, in the holder 10, is such that the pencil-point contact with the paper or pad is in perpendicular alignment with the pivot, thus eliminating distortion of the reproduction, which would otherwise result from any pivotal movement of the pencil.

It is now apparent that by manipulating the pencil, while the hand rests upon the apron, in such a manner to trace the image with the image point 13, the image will be reproduced on the paper by the pencil and actuated solely by "arm movement". Continued use of the appliance teaches the user to keep the eyes on the image while the hand reproduces the latter. This develops a sense of coordination which is essential to the approved muscular or arm movement style of writing.

It is important to note that the foldable base and the non-breakable features of the appliance as well as the provision for collapsing it into a small compass and in "book" form eliminate objections associated with ordinary pantographs and provide for a highly efficacious educational appliance which is particularly well suited for school room usages.

It should also be noted that the entire pencil-holding unit is detachable, so that when the free movement is set up, the pencil and holder may be easily detached so that the same movement and technique may be continued without the use of the pantograph. Inasmuch as good results are obtainable in writing and drawing if the hand and eye are coordinated, it is seen that the appliance of this invention (in requiring that this rule be followed) will serve to develop the desired writing and drawing propensities of the user.

The element of amusement and busy work entering into, enlarging with the appliance, reinforces the memory and enhances its value in teaching children.

I claim:

1. In a writing coordinator, a pantograph having a flexible link, and means for pivotally securing said link to a base, said link being flexible in one plane only in a plane perpendicular to the plane of the surface over which it is pivotally movable.

2. In a writing coordinator, a pantograph having a stylus holder pivotally attached thereto, said stylus holder comprising an apron portion having an upwardly inclined portion, a grommet on said inclined portion for holding said stylus, an extension from said inclined portion, and attaching means on said pantograph and cooperating with said extension for securing said stylus holder to said pantograph.

3. In a writing coordinator the combination of a pantograph and a pencil holding unit therefor, said pantograph having a flexible link for attaching the pantograph to the base, said link being flexible in all planes except that of the base, said pencil unit comprising an apron portion shaped to form a rocker lever so that the attaching end lifts the pantograph when the free end is pressed down.

4. In a writing coordinator, a pantograph including a stylus holder arranged to hold a stylus on an angle of less than ninety degrees and swivel means for attaching said holder to the pantograph.

5. In a writing coordinator, a pantograph including a flexible link and means for effecting a pivotal connection of said link with a base, said link being inflexible in the plane of the surface over which it is pivotally movable in use and otherwise capable of being flexed and twisted without damage thereof or derangement of its pivotal connections.

6. In a writing coordinator, a pantograph including a resilient flexible link and means for effecting a pivotal connection of said link with a base, said link being inflexible in the plane of the surface over which it is pivotally movable in use and otherwise capable of being flexed and twisted without damage thereof or derangement of its pivotal connections, said link automatically returning to normal position when flexing or twisting forces are removed therefrom.

GEORGE T. WRIDE.